Aug. 19, 1958 G. W. MERRITT 2,847,945
FLUID-ACTUATED CAR-MOVING APPARATUS
Filed Feb. 16, 1953 5 Sheets-Sheet 1
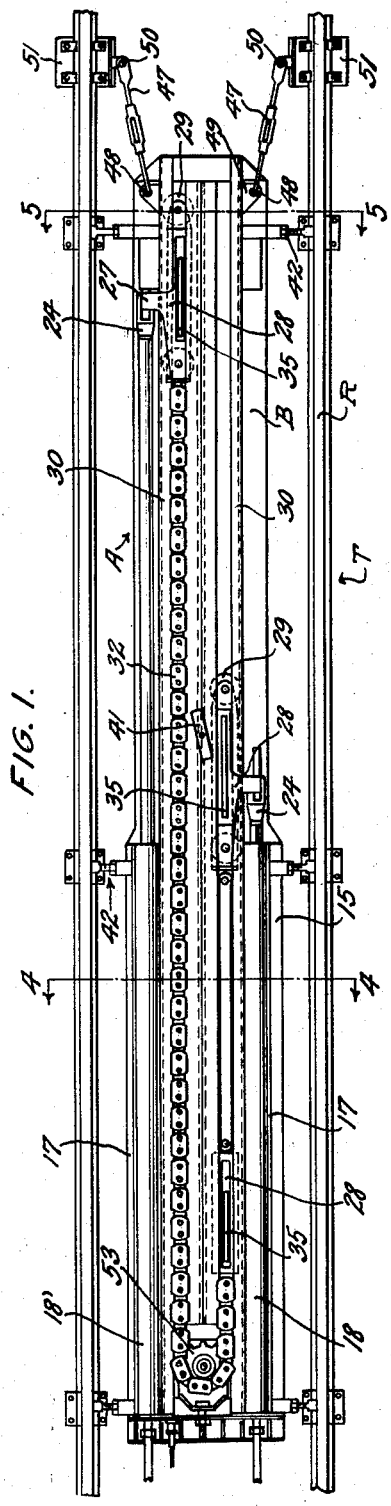
INVENTOR
GLENN W. MERRITT
BY McDowell and Rambo
ATTORNEYS

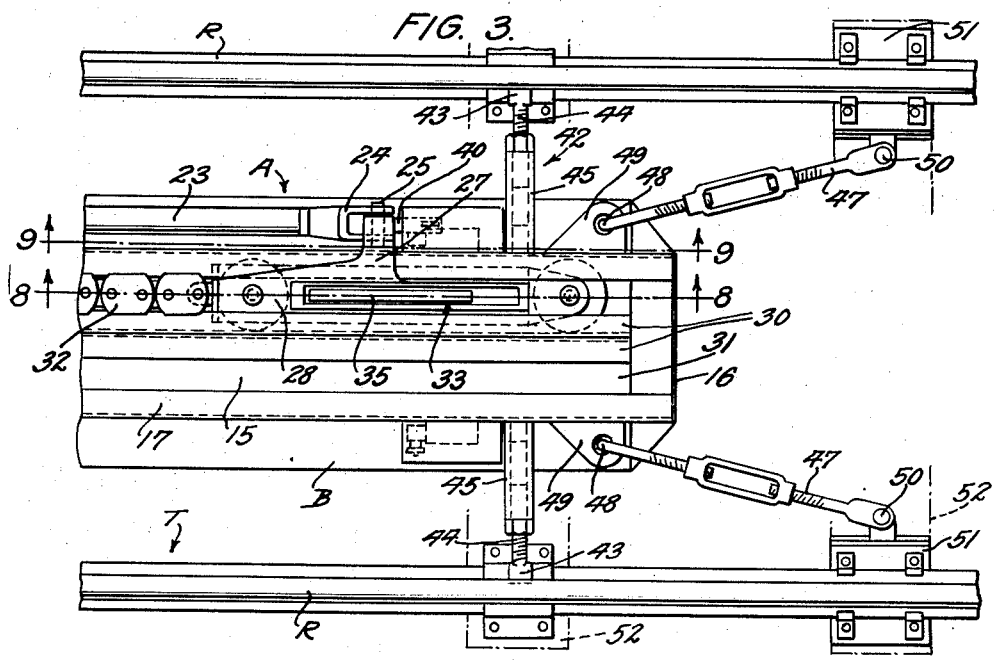
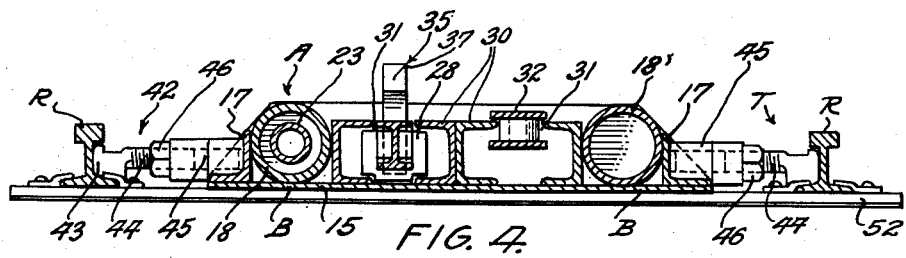
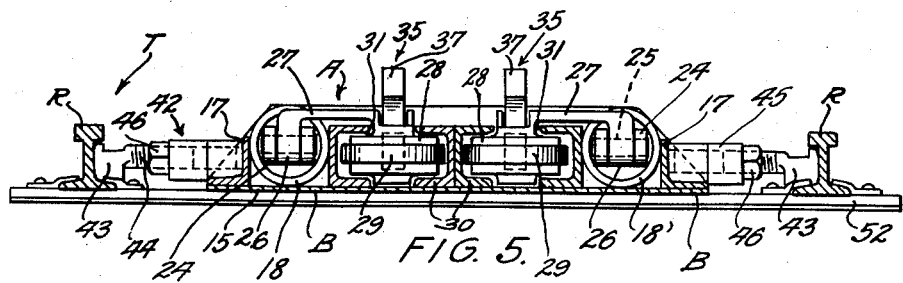

Aug. 19, 1958 G. W. MERRITT 2,847,945
FLUID-ACTUATED CAR-MOVING APPARATUS
Filed Feb. 16, 1953 5 Sheets-Sheet 3
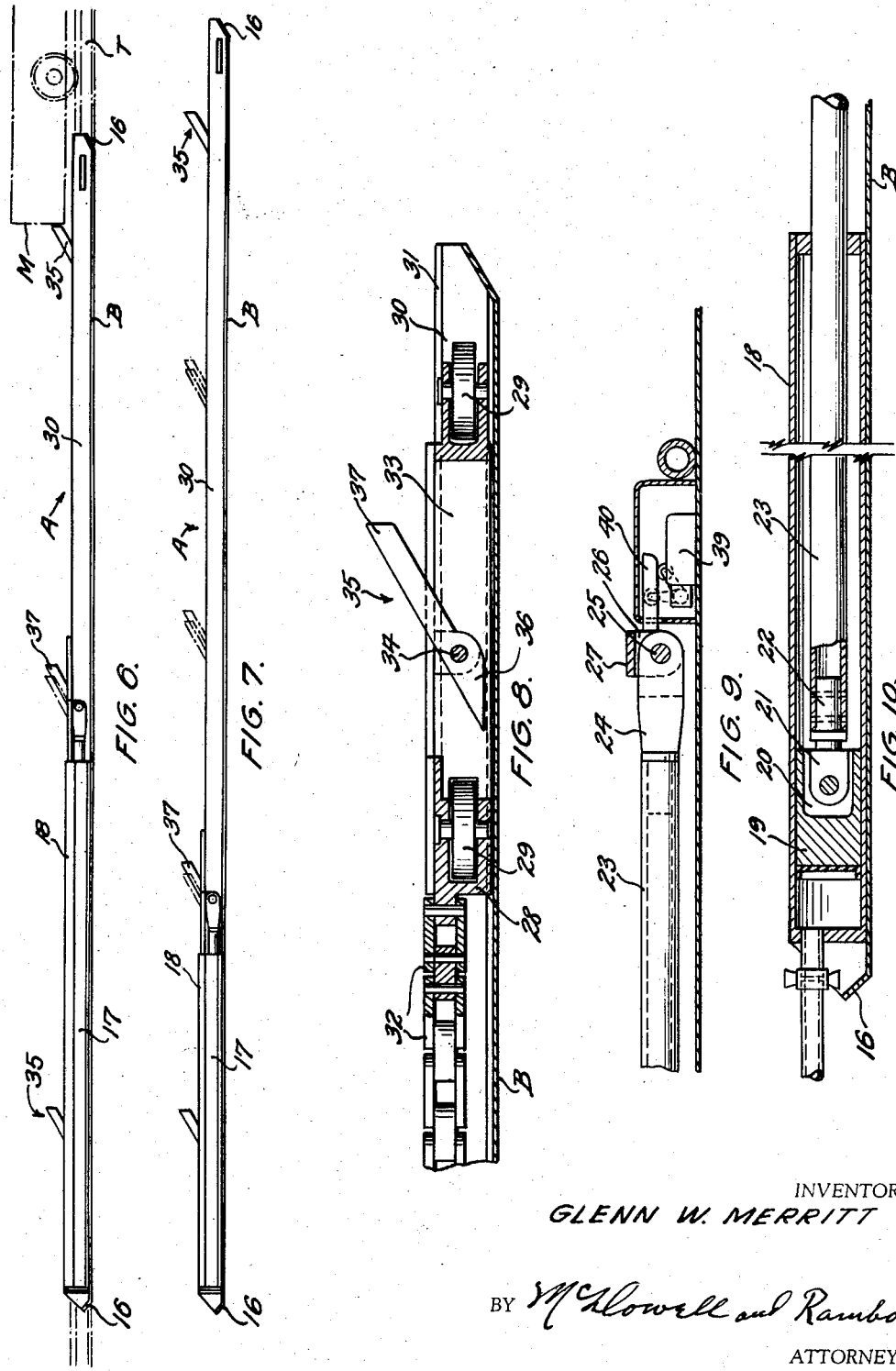
INVENTOR
GLENN W. MERRITT
BY McDowell and Rambo
ATTORNEYS Aug. 19, 1958 G. W. MERRITT 2,847,945
FLUID-ACTUATED CAR-MOVING APPARATUS
Filed Feb. 16, 1953 5 Sheets-Sheet 4
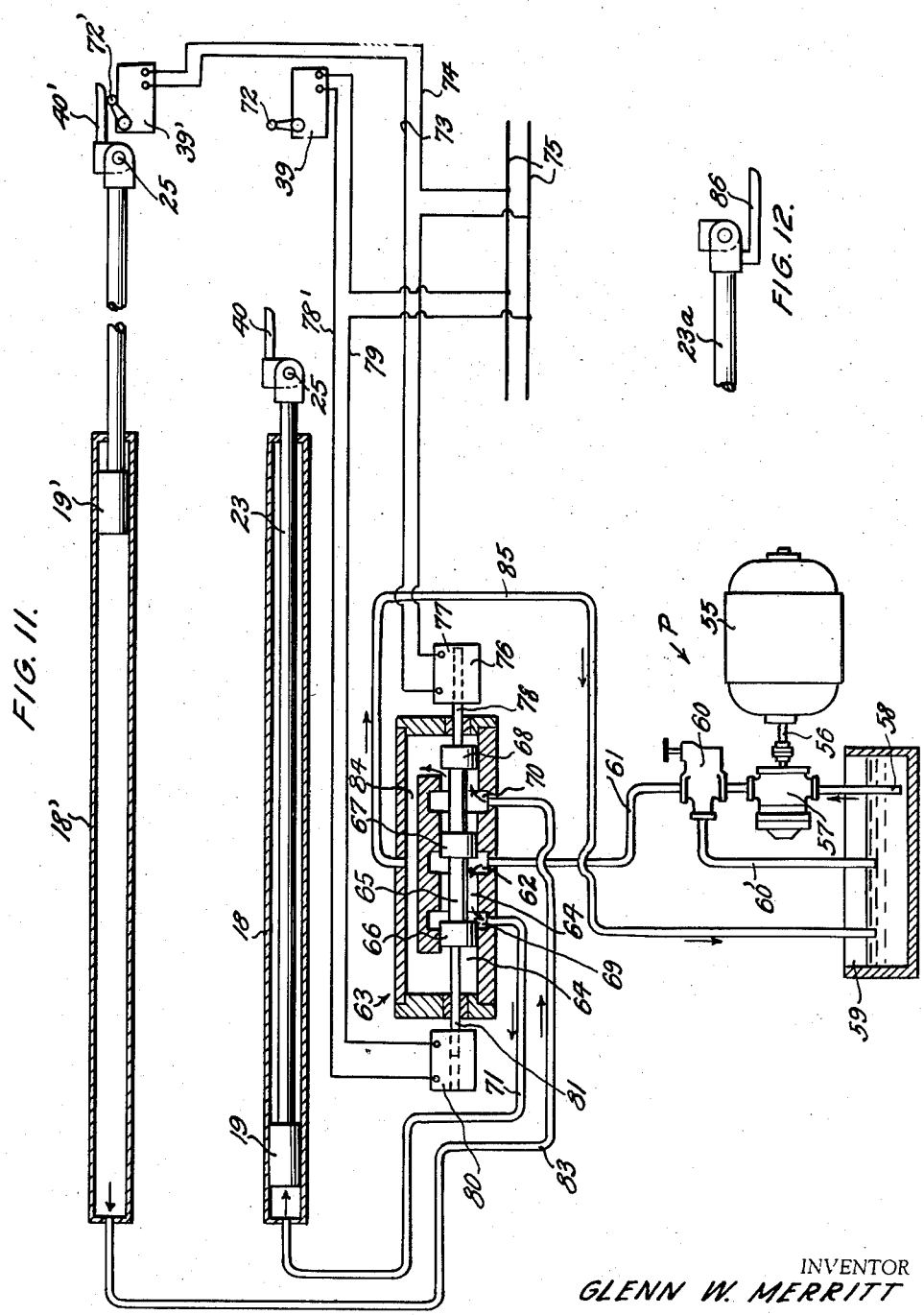
INVENTOR
GLENN W. MERRITT
BY McDowell and Rambo
ATTORNEYS Aug. 19, 1958  G. W. MERRITT  2,847,945
FLUID-ACTUATED CAR-MOVING APPARATUS
Filed Feb. 16, 1953  5 Sheets-Sheet 5

INVENTOR
GLENN W. MERRITT
BY McDowell and Rambo
ATTORNEYS

United States Patent Office 2,847,945
Patented Aug. 19, 1958

2,847,945

FLUID-ACTUATED CAR-MOVING APPARATUS

Glenn W. Merritt, Bowerston, Ohio, assignor to The Nolan Company, Bowerston, Ohio, a corporation of Ohio Application February 16, 1953, Serial No. 337,204

4 Claims. (Cl. 104—162)

This invention has reference to portable, fluid-actuated apparatus adapted for use in moving wheeled cars over a trackway therefor. Such apparatus finds a field of practical application, among other uses, in the coal mining and quarrying industries where the same may be employed, for example, in the rooms and entries of coal mines in moving a string or trip of coupled cars into registration with the discharge ends of loading conveyors or the like, whereby to fill such cars with minerals, and without requiring the use of mine locomotives or rope hoists in the actuation of the cars.

In its more specific aspects, the present invention is concerned with an improved car-moving apparatus embodying a low base frame adapted to be placed flatly on the bed of a trackway beneath the body frames and axles of material-transporting cars movable over the trackway, the frame being placed between the spaced parallel rails of the trackway and anchored in operative relation with the rails. The apparatus further embodies a composite track unit for such car-moving apparatus on which is mounted a pair of spaced, longitudinally extending cylinders, the latter carrying slidable, fluid pressure-actuated pistons. These pistons are adapted to be connected with the inner ends of externally projecting rods which are united at their outer ends with a pair of slidably mounted and guide-confined carriers, the latter being provided with movable car-engaging dogs which are pivotally carried by, and project yieldably in an upward direction from, the carriers. A flexible chain member or wire rope is joined at its ends with the carriers, the chain member or rope being trained around a guide sprocket or other equivalent means rotatably supported on the base frame of the apparatus, so that as fluid is admitted under pressure into an end of one of said cylinders to force the piston and rod thereof outwardly on a car-advancing stroke, the other of said pistons is retracted and fluid expelled from the cylinder containing the same.

The invention further contemplates, in connection with such a fluid-actuated car feeder, a separate power unit adapted to be placed at the side of a trackway and joined with the dog-actuating feeder unit by flexible floor-disposed conduit means. In this regard, both the power and feeder units of the apparatus may readily be placed on or adjacent to a trackway without requiring any preparation in the trackway, such as the digging of pits or the like, in receiving the apparatus, whereby to permit the latter to be transported readily from one working location to another and assembled for use with maximum convenience and in but a minimum of time.

While I am aware that various types of fluid-actuated car-moving mechanisms have been previously proposed and patented in this country and in foreign countries, notably Germany, such prior mechanisms have not met with general adoption in the mining industry of this country. Mine cars, as used in our modern mechanized mines, have a material-holding capacity of three or more tons, depending upon the thickness of the coal seam being mined and the general dimensions of the coal mining appliances and/or loading machines and conveyors used in transferring the coal from working faces to entries or other mine passages containing a trackway for the advancement of trips of coupled mine cars thereover.

In providing a portable power-actuated car feeder which may be placed on such a trackway and actuated to advance a trip of cars thereover, it is important that the feeder comprise a compact unitary assembly of working parts of such dimensions and weight as to permit the same to be readily moved from one working location in a mine to another, and when placed on a trackway, shall necessitate no particular advance preparation therefor, such as the excavation of pits in the trackway to receive the apparatus so that the height thereof will not interfere with car operation thereover.

Certain prior types of car feeders, particular those employing electric motors for driving chains carrying car-engaging dogs, have required the utilization of pits or sunken recesses in the track bed to accommodate, without car interference, the drive sprockets of such chains and the motor driven operating gearing and casings associated therewith. To lower the over-all height of such feeders, and to avoid special preparation and pit formation therefor, it has been proposed to use fluid-actuated dog-operating cylinders to operate the car-engaging dogs, and the present invention has particular reference to fluid-actuated apparatus for the purposes and uses set forth.

Certain prior fluid-actuated feeders employ elongated, piston-containing, parallel cylinders fixed longitudinally on a flat horizontal bed plate or frame in a manner causing the cylinders to be disposed in longitudinally offset relation. This arrangement requires the apparatus to possess substantially the combined length of two cylinders together with the car-engaging dog mechanism actuated thereby. As a result of this construction, the base units are of substantial length so that difficulty is encountered in the matter of loading the apparatus on a car and transporting it from one working location in a mine to another.

Among the objects of the present invention, therefore, are: to provide a portable car-feeding mechanism of the character indicated wherein a short, compact, track-mounted unit is provided and which is capable of being readily transferred from one working location to another; to provide a track-positioned car feeder unit having a pair of fluid-controlled, dog-operating cylinders which are disposed in parallel, side-by-side order on the base frame of the unit, and with the cylinders arranged in substantially coextensive order in a manner reducing to a minimum the over-all length of the track-mounted feeder unit; to provide a car feeder in which an operating fluid is alternately delivered under pump pressures and by automatic valve control to said cylinders to advance a dog-operating piston contained in each of said cylinders on advancing or car-moving strokes; to provide an electrically operated valve mechanism for governing the flow of fluid into the cylinder-containing pistons for timing the admission of fluid under pressure into said cylinders and controlling the length of the stroke of the advancing mechanism; and to provide car-feeding apparatus characterized generally by simplicity of construction, reliability in use, low cost, complete portability, and convenience in installation and operation, without altering track construction in providing for its operative placement.

With these and other objects in view, the invention consists of the novel features of construction, combinations of elements, and arrangements of parts hereinafter more fully described and particularly pointed out in the appended claims.

In the accompanying drawings:

Fig. 1 is a top plan view of the track-mounted feeder unit comprising the present invention;

Fig. 2 is a similar view disclosing the apparatus on a somewhat enlarged scale and illustrating the cylinder-carrying end thereof;

Fig. 3 is a similar view disclosing the opposite or outer end of the feeder unit;

Fig. 4 is a vertical transverse sectional view taken through the apparatus on the plane indicated by the line 4—4 of Fig. 1;

Fig. 5 is a similar view, the plane of which is indicated by the line 5—5 of Fig. 1;

Fig. 6 is a side elevational view of the track-mounted feeder unit of the present invention, illustrating the same in the form which it assumes when the dog mechanism carried thereby is constructed to impart upon each cycle of operation of the apparatus an advancing stroke substantially equal to one-half the length of each of the cars operating thereover;

Fig. 7 is a similar view in which the apparatus is constructed to impart a one-quarter stroke in each cycle of operation by which the advancing stroke of each of the car dogs of the feeder unit produces a movement to a car engaged therewith over a trackway equivalent to approximately one-fourth the total length of each car;

Fig. 8 is a detail longitudinal vertical sectional view taken through one of the car-feeding dogs and its supporting carriage, the plane of the figure being indicated by the line 8—8 of Fig. 3;

Fig. 9 is a similar view disclosing the connection between the outer end of a piston-actuated rod and one of the associated dog carriers, the plane of this figure being indicated by the line 9—9 of Fig. 3;

Fig. 10 is a similar view taken through the cylinder and piston construction of my improved feeder apparatus;

Fig. 11 is a diagrammatic view of the hydraulic system in which the car-feeding unit of the present invention is arranged;

Fig. 12 is a detail sectional view disclosing a slightly modified form of the invention.

Figure 13:
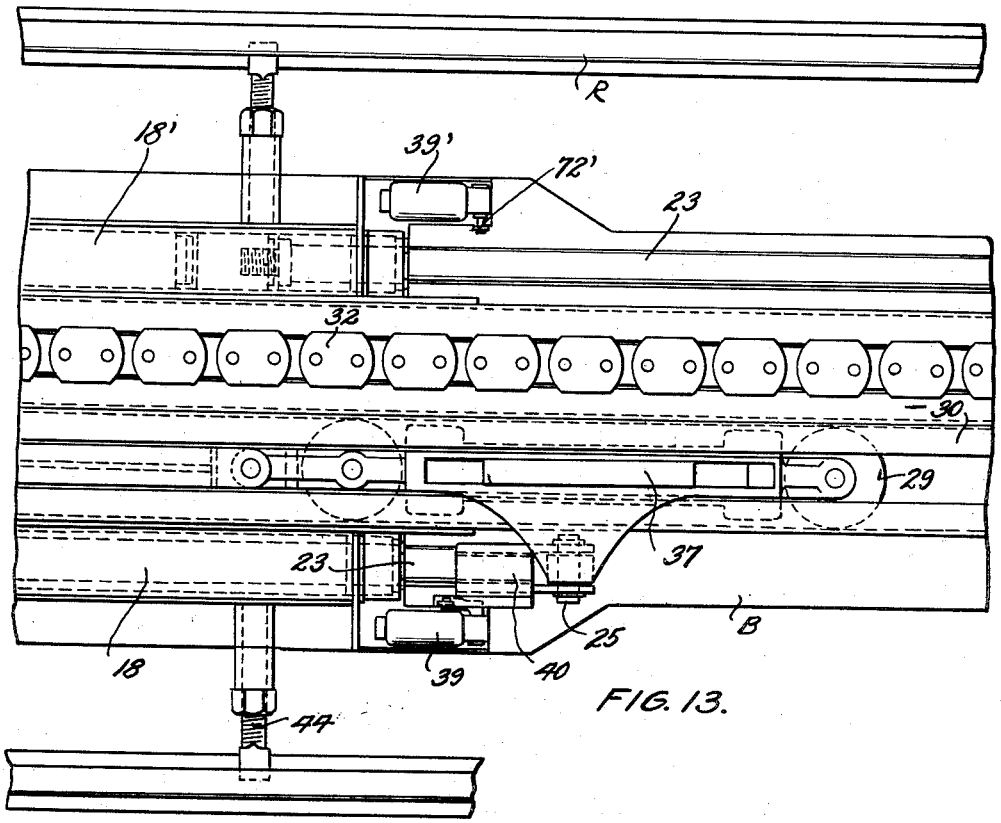
Fig. 13 is a fragmentary top plan view disclosing a modified form of limit switch arrangement employed in controlling the reversing of the car-shifting mechanism.

The car feeder unit A of the present invention comprises a base frame B which is adapted to be placed flatly on the bed of a trackway T, with the unit A being arranged between the rails R of said trackway. The feeder unit has its base frame formed to embody a flat, horizontally placed, substantially rectangular plate 15, having the opposite longitudinal ends thereof turned upwardly and inclined, as at 16, so that the plate as a whole is rendered easily movable or skidable over the bed surface of a trackway. The plate 15 is reenforced by frame-forming angle members 17 which extend longitudinally along the upper face of the plate 15 and are rigidly secured thereto in any appropriate manner.

Rigidly mounted on the upper surface of the plate 15 at one end of the feeder unit and extending in longitudinal parallel relationship are a pair of cylinders 18 and 18'. These cylinders are disposed in contact with the angle iron members 17 and are arranged in coextensive order, as shown more particularly in Figs. 1 and 2 of the drawings. In each of these cylinders there is slidably mounted a piston 19 which is formed at its outer end with a socket 20. Adapted to be articulately received in the socket 20 of each of the pistons 19 is the head 21 of a pin 22, said pin being secured in the open end of a tubular piston rod 23.

Each piston rod projects outwardly through the open forward end of each of the cylinders 18 and terminates at its outer end in a yoke 24. Pivotally connected, as at 25, with each of these yokes is the downturned outer end 26 of a laterally directed arm 27 carried by a dog-equipped carrier of barney 28.

Each of the carriers 28 comprises a frame. Supported in each of these frames is a pair of horizontally disposed longitudinally spaced guide wheels 29 which are disposed for engagement with the inner surfaces of sets of parallel, longitudinally extending, guide channels 30 secured to the upper surface of the plate 15 between and in parallel relationship with the outer angle members 17. The upper horizontal flanges of the channels 30 are spaced to form elongated slots 31 through which the inner portions of the carrier arms 27 project. The channels 30 serve as guides for the dog carriers or barneys, confining the latter to straight, longitudinal, and reciprocatory paths of movement. Also confined for movement in the slots 31 is a length of flexible chain 32, the latter being composed of a plurality of articulately united links movable about vertical pivotal axes. One end of the chain 32 is connected with a pair of the carriers 28, while the other end thereof is joined with a single carrier, as illustrated more particularly in Fig. 1. Each of the carriers or barneys 28 includes an elongated slot 33, carrying a transverse pivotal shaft 34. Mounted for rocking movement on each of these shafts is a pusher element or dog 35. Each of the latter is formed to provide a weighted lower portion 36 which normally occupies the longitudinal portion of the carrier in which it is mounted. Projecting upwardly from the weighted portion 36 of each dog is an inclined finger or detent 37 which is adapted to engage a relatively stationary part of an associated mine car M or other vehicle, such as the axle or bottom frame construction of such a car.

In the operation of the apparatus, with the feeder unit placed on a trackway, as shown in Fig. 1, fluid under pressure is admitted into one of the cylinders 18 or 18'. When the piston 19 is in the position as indicated in Figs. 10 and 11, fluid admitted into the cylinder 18 forces the piston 19 thereof outwardly, together with the piston rod 23. Since the outer end of the piston rod is pivotally connected, as indicated at 25, with an associated dog carrier 28, said carrier moves in unison with the piston and piston rod as the latter advance outwardly under fluid pressure. When the piston reaches approximately the end of its forward stroke, a limit switch, shown at 39, is engaged by a finger 40 of the carrier which operates a control valve mechanism, hereinafter described, discontinuing the flow of fluid to the cylinder. Fluid under pressure is then admitted into the other of the cylinders 18' in which the piston 19' therein has been retracted, and the operating cycle is repeated.

When the dogs are moved rearwardly on their retraction strokes, it will be seen that if the same encounter an obstacle of obstruction of any kind, they will tilt about their pivotal axes 34, lowering the fingers 37 thereon until the obstruction has been cleared. If desired, the dogs may be locked in their downward positions by the provision of a turn cleat, shown at 41, which cleat is mounted on one of the frame members of the feeder unit in position to engage the dog elements when the latter are in registry therewith, and thereby hold the dogs in their downward positions, as when a trip of cars is being reversed in its direction of movement over the feeder. When the feeder is of the length disclosed in Fig. 6, it is adapted for producing half-stroke reciprocation on the part of the dogs for cars up to twenty feet in length, i. e. the stroke produced by the apparatus of Fig. 6 is equivalent to one-half of the full stroke required to advance a trip of cars a distance equal to the length of one car moving over the feeder. Usually, in securing this result, it is necessary to provide for two operations on the part of the cylinders, one operation in an advancing direction by each cylinder. With apparatus of the length shown in Fig. 7, the same is adapted for moving cars of greater length than the apparatus in Fig. 6. In Fig. 7, a quarter-stroke is applied to each of the cylinder means in advancing a car, so that normally four operations of the cylinders are required to produce sufficient movement for a single car to move over the apparatus of Fig. 7.

To hold the feeder unit in its operative position, I employ reel-engaging clamps of the type indicated at 42. Each of these clamps comprise a rail-engaging head 43, from which extends a threaded shank 44. The threaded shank of each clamp is received in a socket provided in a tubular extension 45 projecting from and rigidly carried by the angle rails 17. Each of the shanks 44 is equipped with a clamping nut 46 which, when tightened against the outer end of an associated projection 45, forces and maintains the head 43 of the associated clamp in holding engagement with the web portion of an associated rail bar. Preferably, six of the clamps 42 are utilized in holding the feeder unit in its operating position. Additionally, as shown in Fig. 1, the forward end of the frame B is connected with a pair of turnbuckle-equipped links 47. The inner ends of the links 47 are pivotally connected, as at 48, with brackets 49 projecting from the forward ends of the rail members 17. The outer or forward ends of the links 47 are pivotally connected, as at 50, with track-carried brackets 51 joined with the base flanges of the rails R, and serve to retain the feeder unit secure against sliding movement longitudinally of the rails R. The connections 42 and the link and bracket connections 47 and 51 enable the track-mounted unit of my improved apparatus to be readily secured in its operative position between the rails of the trackway, without requiring any advance preparation in the bed of the trackway to receive the apparatus. The track unit, if desired, may be placed on the flat, transversely extending ties 52 employed as usual in maintaining the track gauge of the rails. It will also be noted that the chain 32 is guided by having its links positioned in the slots 31, as shown in Fig. 4 of the drawings. The chain passes around the sprocket shown at 53, so that when one of the pistons 19 is advancing on its power stroke, the other of the pistons will be retracted in its cylinder by the action of the chain. The retracting piston forces fluid from the cylinder in which the piston is contained.

In association with the track-mounted feeder unit A, the present invention employs a power unit which has been diagrammatically illustrated in Fig. 11 of the drawings, the power unit being indicated in general by the letter P. The power unit comprises an electric motor 55, the armature shaft 56 of which drives a pump, shown at 57. The inlet 58 of this pump is adapted to be submerged in a body of liquid contained in a tank or fluid reservoir 59. Fluid, through the operation of the motor and pump, 55 and 57 respectively, is withdrawn from the reservoir and passed through a pressure relief valve 60 which may be adjustably set to control the operating pressures of the system. In the event of overloading or excess pressures within the system, the valve 60 may be set so that it will open automatically and return excess fluid to the reservoir 59 through the return pipe indicated at 60'.

Leading from the relief valve 60 is a pipeline 61, the latter extending to an annular port 62 formed in a reversing valve 63. Preferably, this valve is of the solenoid-actuated, balanced spool type and includes a longitudinally extending chamber 64 in which is slidably mounted a movable spool-type valve member 65. The valve is formed to include longitudinally spaced heads, indicated at 66, 67, and 68, which are adapted to control the flow of pressure fluid from the inlet port 62 to the separate motor or outlet ports 69 and 70 which are formed in the housing or casing of the valve 63 and spaced longitudinally, one either side of the inlet port 62.

With the parts of the reversing valve positioned as disclosed in Fig. 11, it will be seen that fluid under pressure enters the valve by way of the port 62 and passes thence to the outlet port 69. From the port 69, the fluid passes through a pipe line 71 and enters the forward end of the cylinder 18 to impart pressure and working forces to the piston 19 so that the latter will be advanced outwardly of the cylinder on its working stroke. This movement on the part of the piston 19 is continued until the finger 40, carried by the outer end of the piston rod 23, contacts the actuating member 72 of the limit switch 39. As shown in Fig. 11, the cylinder 18' has its piston 19' disposed at the extreme outer portion of its forward movement, with the finger 40' in contact with the actuating member 72' of the limit switch 39'. With the finger 40' in contact with the arm 72' of the limit switch 39', as shown in Fig. 11, an energizing circuit for the field winding 76 of a solenoid 77 is completed. This circuit comprises the leads 73 and 74 which connect the limit switch 39' and the solenoid 77 in series circuit with power lines 75. The armature of the solenoid comprises the reduced end 78 of the valve member 65, so that when the solenoid 77 is energized, the valve member is shifted to the right, as shown in Fig. 11, and the member remains in this position until shifted to an opposite end position by energization of a second solenoid 80 arranged at the opposite end of the valve member 65. After the piston 19 in the cylinder 18 reaches the outer limit of its working stroke, the finger 40 thereof contacts the limit switch actuating arm 72 and completes a second circuit composed of the conductors shown at 78' and 79 which are connected with the power lines 75 and which include the limit switch 39 and the field winding of the solenoid 80.

By this arrangement, when the finger 40 operates the limit switch 39 to close the circuit including the conductors 78 and 79, the solenoid 80 is energized, attracting the armature portion 81 of the valve member and moving the spool to the left, as viewed in Fig. 11, so that the head 67 of the spool valve will be disposed at the left of the inlet port 62, causing the fluid from the pump 57 to flow into the port 70 and thence into the pipe line 83 leading to the inlet end of the cylinder 18'. While the piston 19 in the cylinder 18 is moving outwardly on its advance stroke, the piston rod 23 having connection with the chain 32 causes the piston 19' in the cylinder 18' to move on its fluid-expelling or return stroke. During this return stroke, the fluid expelled from the cylinder 18' passes through the pipe line 83, thence through the port 70, and through the right hand end of the chamber 64, traveling, as shown by the arrows, past the head 68 and into the enlarged exhaust chamber 84 of the valve and thence through a pipe line 85 which leads back to the reservoir 59. At the time the piston 19' arrives at the end of its return stroke, the flow of fluid under pressure to the cylinder 18 is discontinued through the automatic operation of the valve 63, and the valve member 65 therein is shifted by energization of the solenoid 80, so that fluid flow will pass under pressure from the pump 57 to the cylinder 18' to force the piston 19' therein on its outward or car-advancing stroke.

Figure 14:
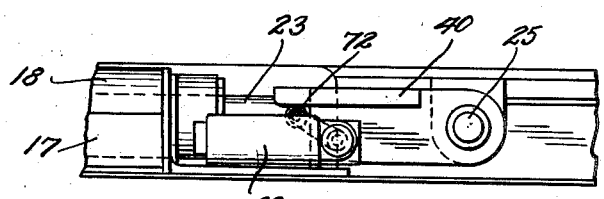
Fig. 14 is a detail side elevational view of one of the limit switches disclosed in Fig. 13 and associated parts.

In the modification of the invention disclosed in Figs. 12, 13, and 14, the piston rod 23a is shown as being provided with a finger 86 by which the limit switch associated therewith may be operated, rather than assigning this function to the dog frame or carrier as in the form of the invention illustrated in the remaining figures of the drawings. Preferably, the conduits or pipe lines 71 and 83, which lead from the car unit section of the apparatus to the track-mounted feeder unit, comprise lengths of flexible hose. Such hose may be readily laid on the floor of a mine at one side of a trackway, passing under the tracks to the cylinders 18 and 18' of the car feeder unit.

In view of the foregoing, it will be evident that the present invention provides a portable, easily installed, car-feeding mechanism which may be readily transferred from one location in a mine to another, and operatively installed in a new location in a prompt and readily executed manner, without involving any particular preparation in the construction of the trackway for receiving the mechanism.

The mechanism comprises but two readily portable unitary sections: first, a track-mounted, car-feeding unit or section, and second, a power section, the latter being disposed on the floor of a mine adjacent the side of a trackway on which the car-feeding unit or section is disposed and united therewith by readily laid and joined sections of flexible tubing. The entire mechanism is characterized by its structural simplicity, compactness, and ease of operation. It will be observed that after the operation has been manually initiated, automatic cycle-repeating operation of the car-advancing dogs then takes place.

The compactness of my improved track-mounted unit is obtained primarily by disposing the cylinders shown at 18 and 18' in parallel, coextensive, longitudinal order on the base frame and by uniting the sliding pistons and piston rods of these cylinders with the chain 32, or other equivalent flexible means, whereby a simple, single-acting, servomotor device is provided for each cylinder which readily responds to the automatic controls provided by the limit switches 39 and 39' and their associated parts.

It will be understood that the mechanism may operate on single cars, or cars coupled in trip or train-forming order. Any desired number of the dogs may be employed. In the form of the invention depicted in Fig. 1, three of such dogs have been illustrated, whereby to adapt the feeder unit to cars of different lengths.

In the modified form of the invention depicted in Figs. 13 and 14, the limit switches 39 and 39' are mounted on the base B contiguous to the outer ends of the cylinders 18 and 18'. In this form of my invention, the operating fingers 40 and 40' are carried by the outer ends of the piston rods 23, instead of being mounted on the pawl carrier as in the previous form of my invention. This arrangement provides for a greater compactness and more positive operation. It will be noted that the switches 39 and 39' have their actuators 72 and 72', in the construction disclosed in Figs. 13 and 14, so disposed that the adjacent limit switches are operated to close their respective circuits upon retraction of the piston rods, rather than upon their advance as in the previously described form of my invention.

Figure 15:
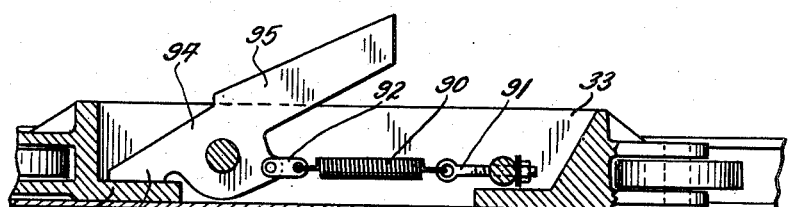
Fig. 15 is a detail vertical sectional view disclosing a modified form of a car-engaging pawl adapted for use in connection with the mechanism of the present invention.

In the pawl arrangement disclosed in Fig. 15, an improved operation is provided by causing the pawls or dogs 37 to maintain their yieldable elevated positions through the use of a spring 90. This spring is joined with an adjustable bolt 91 at one end which is carried by the block or frame 28, while the opposite end of the spring is linked, as at 92, in an offset manner with the pivoted lower end 94 of the pawl 95. The pull of the spring 90 maintains a stop extension 96 in contact with the flange 97 of the pawl carrier.

It will be appreciated that various changes or modifications may be made in the construction of the apparatus from time to time in accordance with the dictates of practice without departing from the spirit and scope of the present invention as defined by the following claims.

I claim:

1. In car-shifting apparatus, a base frame adapted to be placed flatly on an associated trackway between car wheel-engaging rails of the trackway; threaded positioning clamps projecting outwardly and laterally at longitudinally spaced intervals from said frame, said clamps having engagement with the web regions of the rails of said trackway to confine said base frame between said rails and in united relationship therewith; a pair of pivoted links connected with the front end of said base frame; rail-carried clamps; pivotal means uniting said links with said rail-carried clamps; and a power-actuated car-shifting mechanism mounted on said frame, said mechanism being engageable with cars positioned on said trackway to move the latter longitudinally of the trackway.

2. Car-moving apparatus comprising: a flat base frame formed to be placed and secured on the bed of a trackway between the rails thereof; a pair of transversely spaced, longitudinally extending, parallel cylinders stationary on said frame, both of said cylinders being disposed toward one end of said frame in relatively coextensive, longitudinally arranged, and transversely aligned order; a piston slidably mounted in each of said cylinders; a piston rod connected at its inner end with each of said pistons and projecting exteriorly from one end of the cylinder containing the piston with which the rod is connected; rigid, channel-forming members mounted on and extending centrally and longitudinally of said frame between said cylinders from substantially one end of the frame at the outer ends of the cylinders to the other end of the frame, said members being formed to provide a wall structure having spaced side and upper walls forming a pair of spaced, parallel, longitudinal guide channels, the latter having coextensive restricted slots in the upper walls thereof; dog carriers confined for longitudinal reciprocating movement in said channels, a dog pivotally mounted on each of said carriers and projecting upwardly therefrom through one of said slots to provide a vertically movable, car-engaging and propelling extension; coupling means extending through said slots and outwardly and laterally over said channel members for uniting the exteriorly projecting outer end of each piston rod with one of said dog carriers, whereby to produce reciprocatory movement of said carriers in unison with said pistons and rods connected therewith; rollers mounted on said carriers having antifriction contact with the walls of said guide channels; flexible connecting means uniting said carriers for movement in unison, said means being guided throughout substantially the full length thereof by the slots in said channel-forming members and being disposed to extend between said cylinders; additional guide means on said base frame arranged adjacent to the ends of the cylinders opposite to those from which the rods project and around which additional guide means intermediate portions of said flexible connecting means are trained to produce parallel lengths which have terminating ends secured to said carriers, said connecting means serving to provide a mechanical tie between said carriers to cause the same and the pistons connected therewith to move in opposite directions; and a pressure fluid system operative upon predetermined stroke movement of said pistons and parts actuated thereby for alternately admitting fluid under pressure into one end of each cylinder and expelling fluid contained in the cylinder from the opposite end thereof.

3. Track-mounted apparatus for imparting movement to wheeled cars, comprising: a flat base frame formed to be positioned on the bed of a trackway between the rails thereof; clamping means carried by said frame for engagement with said rails to stationarily and detachably unite said frame therewith; a pair of transversely spaced, longitudinally extending, and horizontally disposed cylinders mounted rigidly on said frame toward one end thereof in relatively coextensive, transversely aligned, parallel order; stationary guide members mounted on said frame between said cylinders, said members extending longitudinally of said frame from the adjacent outer ends of said cylinders throughout substantially the full length of the frame and being formed with spaced side and top walls defining coextensive, longitudinal guide channels having slots of restricted width in the top walls thereof; roller-equipped, dog-carrying barneys confined for longitudinal reciprocating movement in said channels;

a link chain joined at its end with said barneys, said chain being formed of links which fit within and engage with the walls of said slots; dogs pivotally carried by said barneys and projecting upwardly through said slots for engagement with cars movable on said trackway; a horizontally disposed sprocket mounted on said frame at one end thereof between said cylinders, said chain having intermediate portions thereof trained around said sprocket for guidance thereby during travel of the chain from the slot of one of said channels to that of the other channel; a piston slidable in each of said cylinders; a pair of piston rods, each of said rods being connected at its inner end with one of said pistons and at its outer end with one of said barneys; and a pressure fluid system operative upon predetermined movement of said carriers for alternately admitting fluid into and expelling the same from said cylinders.

4. In car-moving apparatus; an elongated, relatively narrow base plate adapted to be placed flatly on a trackway between car wheel-engaging rails of the trackway; clamping means detachably and stationarily uniting said plate at longitudinally spaced intervals with said rails; a pair of transversely spaced, longitudinally extending, parallel cylinders stationarily carried by said plate, said cylinders being disposed in substantially coextensive, transversely aligned, relative order with respect to each other; a piston slidably mounted in each of said cylinders; an exteriorly projecting piston rod connected with the piston of each cylinder; a plurality of spaced, rigid, stationary guide members carried by and extending centrally and longitudinally of said base plate between said cylinders from the adjacent outer ends thereof, said members having rigid side and top walls forming a pair of transversely spaced, longitudinally extending, parallel guide channels; a dog carrier slidably mounted for car-advancing and retracting movement in each of said channels; means rigidly joined with said carriers and extending laterally therefrom for connecting the exteriorly projecting, outer end of each piston rod with one of said carriers; pivoted dog means projecting outwardly from and mounted on said carriers for engagement with cars positioned on said trackway; a link chain guided in said channels to provide parallel lengths extending between said cylinders, the ends of the chain being connected with said carriers; and a pressure fluid system operative upon predetermined, car-advancing and retracting movement of said carriers for alternately admitting fluid into and expelling the same from corresponding ends of said cylinders.

References Cited in the file of this patent

UNITED STATES PATENTS

| | | |
|---|---|---|
| 1,947,354 | Mullen | Feb. 13, 1934 |
| 2,234,287 | Sluyer | Mar. 11, 1941 |
| 2,529,663 | Robinson | Nov. 14, 1950 |
| 2,606,504 | Stamler | Aug. 12, 1952 |
| 2,621,610 | Boyko et al. | Dec. 16, 1952 |
| 2,642,006 | Merrit et al. | June 16, 1953 |

FOREIGN PATENTS

| | | |
|---|---|---|
| 583,918 | Germany | Sept. 12, 1933 |
| 679,852 | Germany | July 20, 1939 |
| 697,706 | Germany | Sept. 26, 1940 |
| 448,835 | Great Britain | June 16, 1936 |